US008233590B2

(12) United States Patent
Chung et al.

(10) Patent No.: US 8,233,590 B2
(45) Date of Patent: Jul. 31, 2012

(54) METHOD FOR AUTOMATICALLY CONTROLING VOLUME LEVEL FOR CALCULATING MOS

(75) Inventors: Jong Tae Chung, Seongnam (KR); Jin Soup Joung, Seongnam (KR); Young Su Kwak, Seongnam (KR); Jin Man Kim, Seongnam (KR); Hyun Seok Cho, Seongnam (KR)

(73) Assignee: Innowireless Co., Ltd., Seongnam-si (KR)

( * ) Notice: Subject to any disclaimer, the term of this patent is extended or adjusted under 35 U.S.C. 154(b) by 1051 days.

(21) Appl. No.: 12/095,905

(22) PCT Filed: Nov. 28, 2006

(86) PCT No.: PCT/KR2006/005030
§ 371 (c)(1),
(2), (4) Date: Jun. 2, 2008

(87) PCT Pub. No.: WO2007/064122
PCT Pub. Date: Jun. 7, 2007

(65) Prior Publication Data
US 2008/0285764 A1 Nov. 20, 2008

(30) Foreign Application Priority Data

Dec. 1, 2005 (KR) .................. 10-2005-0116361

(51) Int. Cl.
*H04M 1/24* (2006.01)
*H04M 3/08* (2006.01)
*H04M 3/22* (2006.01)
(52) U.S. Cl. ....... 379/1.01; 455/423; 704/206; 704/225; 704/236
(58) Field of Classification Search .......... 455/33.1, 455/67.1, 67.2, 67.3, 54.2, 423, 424, 425, 455/501, 63; 381/48; 379/1.01, 29.01, 32.01, 379/24; 704/200, 226, 205, 206, 220, 225, 704/236, 238
See application file for complete search history.

(56) References Cited

U.S. PATENT DOCUMENTS 5,737,389 A * 4/1998 Allen .................. 379/1.01
(Continued)

FOREIGN PATENT DOCUMENTS

EP 0887957 A2 12/1998
(Continued)

OTHER PUBLICATIONS

International Search Report dated Feb. 22, 2007.

*Primary Examiner* — Binh Tieu
(74) *Attorney, Agent, or Firm* — Rothwell, Figg, Ernst & Manbeck, P.C.

(57) ABSTRACT

The present invention relates to a method of automatically controlling the volume level of communication speech for Mean Opinion Score (MOS) measurement, which, before evaluating the quality of communication speech using a MOS measurement method, automatically controls the volume level of actual communication speech to a predetermined optimal level, thus improving the reliability of MOS values. The present invention provides a method of automatically controlling a volume level of communication speech for MOS measurement using MOS measurement equipment, the MOS measurement equipment calculating an MOS value based on results obtained by comparing a speech signal, which is received via a voice communication network, with a reference speech signal, the method comprising the steps of (a) when an audio signal, including a speech signal, is received from counterpart MOS measurement equipment in a predetermined format, measuring the volume level of the speech signal and comparing the volume level of the measured speech signal with a reference volume level; (b) transmitting a predetermined intrinsic audible frequency signal, which corresponds to 'proper,' 'excess' or 'insufficiency' information resulting from the comparison, to the counterpart MOS measurement equipment; and (c) the counterpart MOS measurement equipment interpreting the predetermined intrinsic audible frequency signal, which corresponds to the 'proper,' 'excess' or 'insufficiency' information, and controlling the volume level of the communication speech.

10 Claims, 4 Drawing Sheets

U.S. PATENT DOCUMENTS

| | | | | |
|---|---|---|---|---|
| 5,933,475 A | * | 8/1999 | Coleman | 379/10.01 |
| 5,987,320 A | * | 11/1999 | Bobick | 455/423 |
| 6,134,302 A | * | 10/2000 | Sasin et al. | 379/1.01 |
| 6,181,917 B1 | | 1/2001 | Mansour et al. | |
| 6,330,428 B1 | | 12/2001 | Lewis et al. | |
| 6,490,552 B1 | * | 12/2002 | Lee et al. | 704/209 |
| 6,609,092 B1 | * | 8/2003 | Ghitza et al. | 704/226 |
| 7,664,231 B2 | * | 2/2010 | Schmidmer et al. | 379/1.02 |
| 2004/0186716 A1 | * | 9/2004 | Morfitt et al. | 704/236 |
| 2006/0080092 A1 | * | 4/2006 | Sherman | 704/226 |
| 2006/0093094 A1 | * | 5/2006 | Xing et al. | 379/1.02 |
| 2008/0151769 A1 | * | 6/2008 | El-Hennawey et al. | 370/252 |

FOREIGN PATENT DOCUMENTS

| | | |
|---|---|---|
| JP | 09-018429 A | 1/1997 |
| JP | 11-154901 A | 6/1999 |

* cited by examiner

[Figure 1]
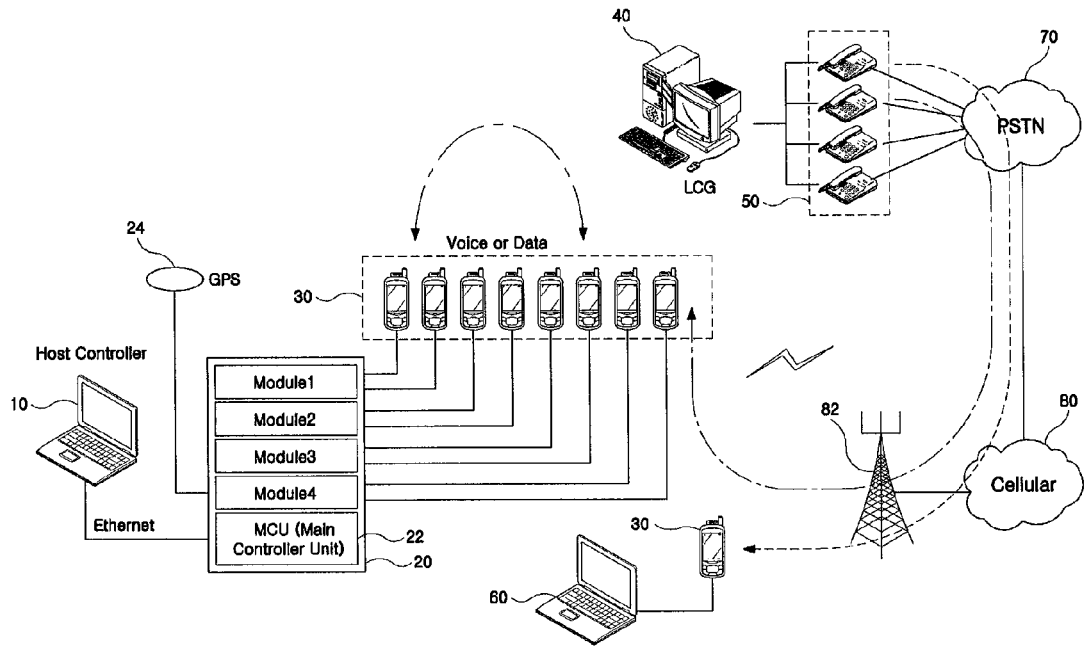
[Figure 2]
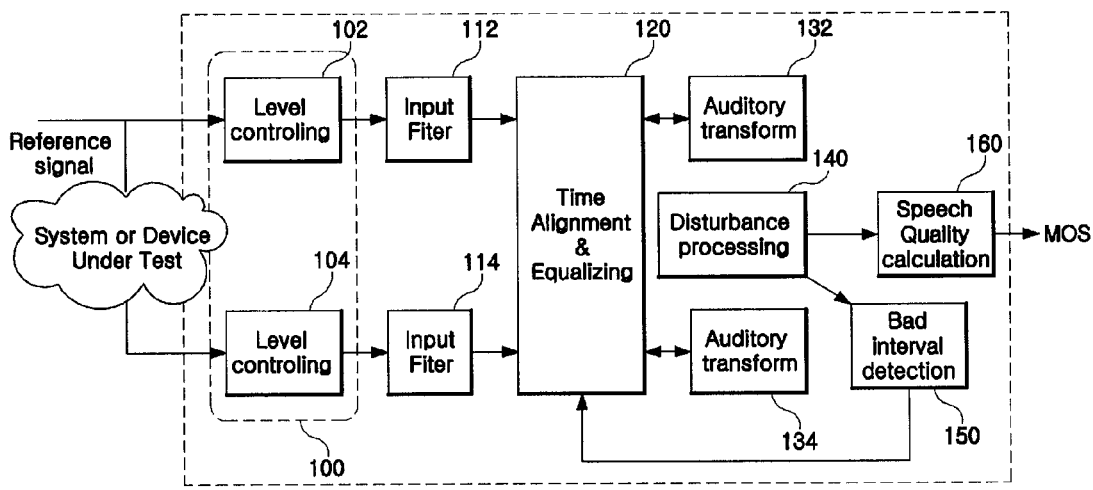

[Figure 3]
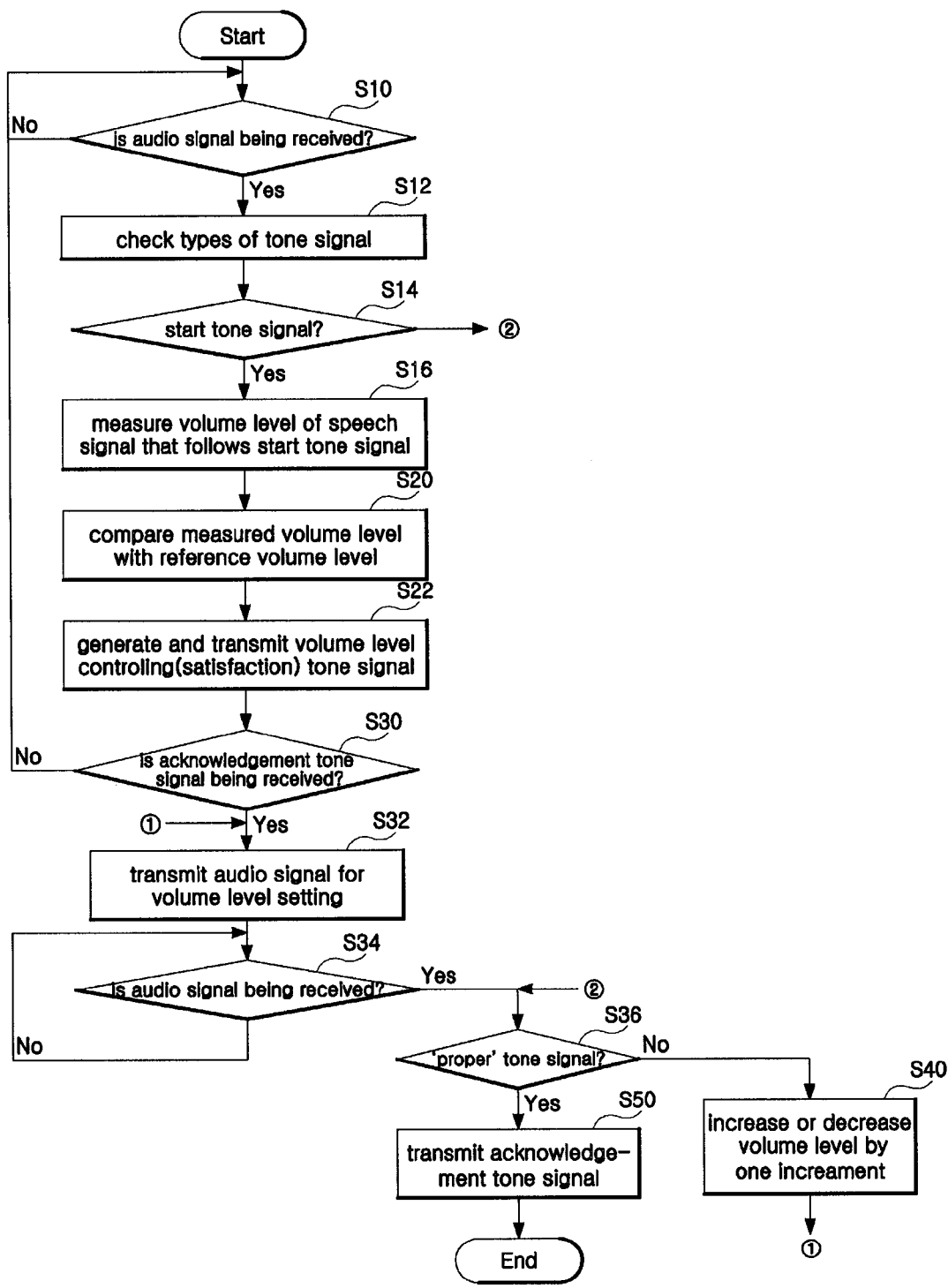

[Figure 4]
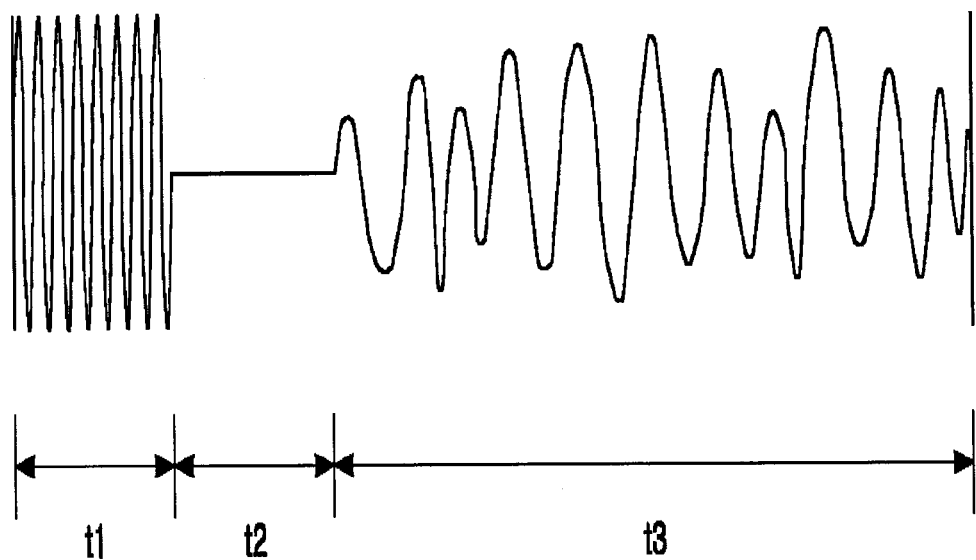

[Figure 5]
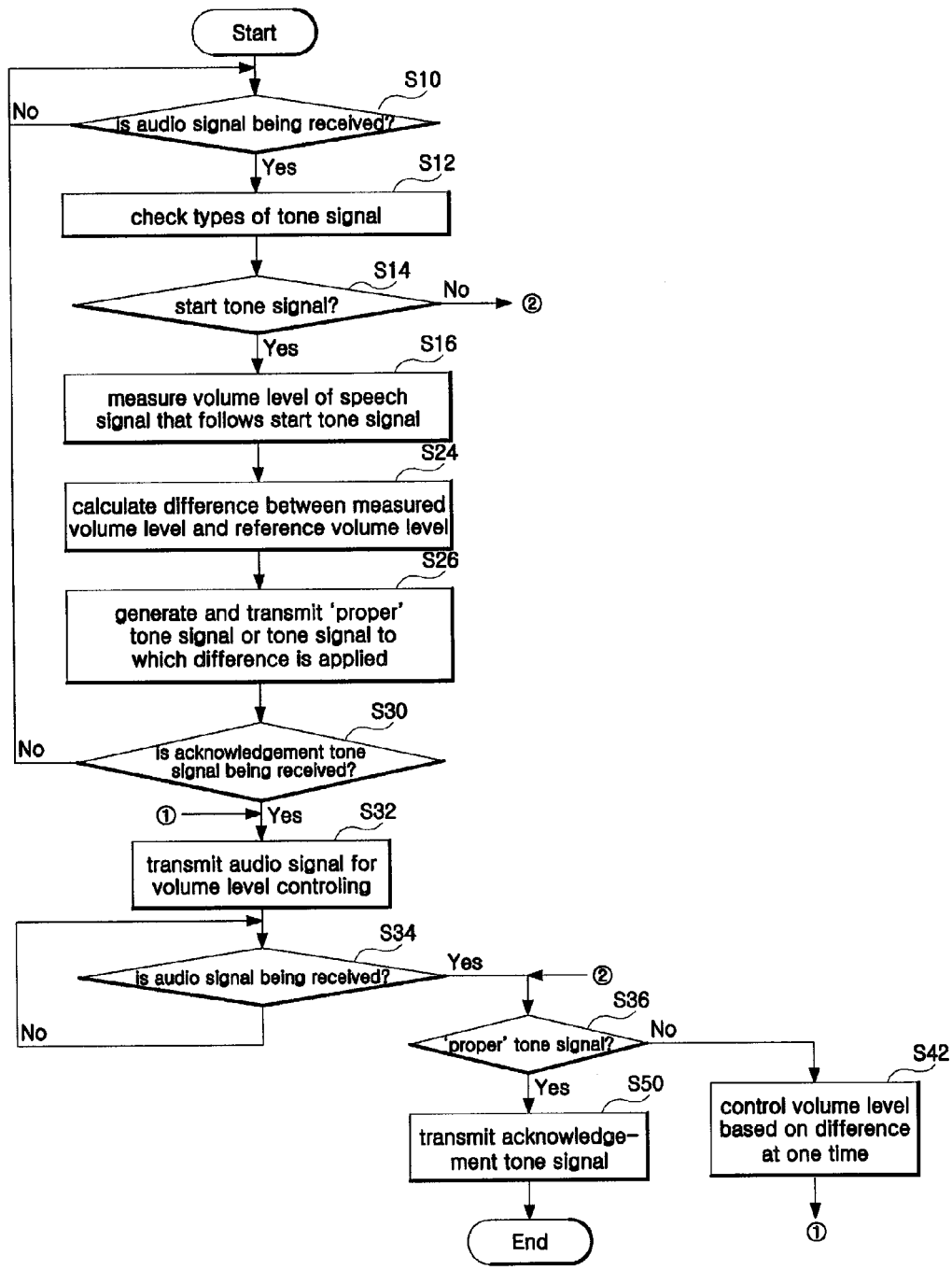

METHOD FOR AUTOMATICALLY CONTROLING VOLUME LEVEL FOR CALCULATING MOS

TECHNICAL FIELD

The present invention relates to a method of automatically controlling the volume level of communication speech for Mean Opinion Score (MOS) measurement and, more particularly, to a method of automatically controlling the volume level of communication speech for MOS measurement, which, before evaluating the quality of communication speech using a MOS measurement method, automatically controls the volume level of actual communication speech to a predetermined optimal level, thus improving the reliability of MOS values.

BACKGROUND ART

Recently, with the rapid development of semiconductor and communication technologies, mobile communication terminals have been widely popularized to the extent that they are used as portable devices nationwide. Furthermore, with the advent of new technology, new models having various types of functions are successively marketed, and rapidly replace out-of-date models.

Meanwhile, in the case of mobile communication terminal manufacturers, it is necessary for each mobile communication terminal manufacturer to ascertain the quality of actual communication speech of each terminal, which it has manufactured, in order to manufacture terminals of the highest quality. Furthermore, even in the case of mobile phone companies, it is necessary for each mobile phone company to ascertain the quality of actual communication speech of each terminal in order to check and optimize the performance and conditions of mobile communication networks that it operates and maintains. As a method of evaluating the quality of actual communication speech, the MOS has been proposed. The MOS is a subjective measurement method that evaluates the quality of communication speech based on five levels, which are indicated in the following table 1, by causing a plurality of users to listen to the communication speech, representing the degree of user satisfaction as scores, and obtaining the average of the scores.

TABLE 1

| MOS Value | Quality Level |
| --- | --- |
| 5 | Excellent |
| 4 | Good |
| 3 | Fair |
| 2 | Poor |
| 1 | Bad |

The MOS measurement method is a subjective measurement method, as described above, and thus the objectivity thereof is low and, at the same time, the cost of taking measurements is high, therefore automated and objective methods have recently been preferred. In greater detail, there are Perceptual Speech Quality Measurement (PSQM), defined in ITU-T P.861, and Perceptual Evaluation of Speech Quality (PESQ), defined in ITU-T P.862 to respond to packet loss and the like based on the PSQM.

Meanwhile, the above-described MOS measurement method can be performed in such a way as to measure the quality of actual communication speech between mobile communication terminals or the quality of actual communication speech between a mobile communication terminal and a wired telephone. In this case, an MOS value may change according to actual communication speech between the two communication terminals, and thus the reliability of MOS values is assured only when the actual communication speech is appropriately controlled.

However, conventional measurement equipment, in which the above-described MOS measurement algorithm is installed, is configured such that a tester manually and directly controls the volume level of communication speech, so that it is problematic in that the probability of the occurrence of a manipulation error still exists, in particular, in that, even though the tester controls the communication speech to a predetermined value, an MOS value can change because the volume level of actual communication speech varies according to the mobile communication network environment or the characteristics of each mobile communication terminal.

Furthermore, conventionally, when a tester is spaced apart from counterpart measurement equipment, he or she must move to the counterpart measurement equipment in order to control the volume level of the counterpart measurement equipment, therefore there are problems in that the usage thereof is inconvenient and a lot of measurement time and a considerable amount of man power are required.

DISCLOSURE

Technical Problem

The present invention has been made keeping in mind the above problems occurring in the prior art, and an object of the present invention is to provide a method of automatically controlling the volume level of communication speech for MOS measurement, which, before evaluating the quality of communication speech using an MOS measurement method, automatically controls the volume level of actual communication speech to a predetermined optimal level, thus improving the reliability of MOS values.

Another object of the present invention is to provide a method of automatically controlling the volume level of communication speech for MOS measurement, which, even when a tester is spaced apart from counterpart measurement equipment, can remotely and automatically control the volume level of actual communication speech generated by the counterpart measurement equipment.

Technical Solution

In order to accomplish the above objects, the present invention provides a method of automatically controlling the volume level of communication speech for MOS measurement using MOS measurement equipment, the MOS measurement equipment calculating an MOS value based on results obtained by comparing a speech signal, which is received via a voice communication network, with a reference speech signal, the method comprising the steps of (a) when an audio signal, including a speech signal, is received from counterpart MOS measurement equipment in a predetermined format, measuring the volume level of the speech signal and comparing the volume level of the measured speech signal with a reference volume level; (b) transmitting a predetermined intrinsic audible frequency signal, which corresponds to 'proper,' 'excess' or 'insufficiency' information resulting from the comparison, to the counterpart MOS measurement equipment; and (c) the counterpart MOS measurement equipment interpreting the predetermined intrinsic audible frequency signal, which corresponds to the 'proper,' 'excess' or 'insufficiency' information, and controlling the volume level of the communication speech.

Advantageous Effects

In accordance with a method of automatically adjust controlling the volume level of communication speech for MOS measurement according to the present invention, the volume level of actual communication speech is automatically controlled to a predetermined optimal level before the quality of communication speech is evaluated using an MOS measurement method, so that the reliability of MOS values can be improved. Furthermore, the present invention is convenient in that, even when a tester is spaced apart from counterpart measurement equipment, the volume level of actual communication speech generated by the counterpart measurement equipment can be remotely and automatically controlled.

DESCRIPTION OF DRAWINGS

FIG. 1 is a diagram showing the network construction of a typical MOS measurement system;

FIG. 2 is a block diagram showing the detailed functional blocks of an MOS measurement algorithm to which the method of the present invention is applied;

FIG. 3 is a flowchart illustrating a method of automatically controlling the volume level of communication speech for MOS measurement according to an embodiment of the present invention;

FIG. 4 is a waveform diagram illustrating the structure of an audio signal for volume level control according to an embodiment of the present invention; and FIG. 5 is a flowchart illustrating a method of automatically controlling the volume level of communication speech for MOS measurement according to another embodiment of the present invention.

Description of characters of principal elements

| | |
|---|---|
| 10: | host computer |
| 20: | relay equipment |
| 30: | mobile communication terminals |
| 40: | MOS measurement equipment |
| 50: | wired telephones |
| 60: | MOS measurement equipment |
| 70: | PSTN |
| 80: | mobile communication network |
| 100: | MOS measurement algorithm |
| 102 and 104: | level controling units |
| 112 and 114: | input filter units |
| 120: | time alignment and equalizing unit |
| 132 and 134: | auditory transform units |
| 140: | disturbance processing unit |
| 150: | bad interval detection unit |
| 160: | speech quality calculation unit |

MODE FOR INVENTION

A preferred embodiment of a method of automatically controlling the volume level of communication speech for MOS measurement is described with reference to the accompanying drawings below.

FIG. 1 is a diagram showing the network construction of a typical MOS measurement system. As shown in FIG. 1, the typical MOS measurement system enables MOS measurements, which target actual communication speech between mobile communication terminals 30 and on actual communication speech between wired telephones 50 and the mobile communication terminals 30, and thus may include MOS measurement equipment 40 connected to the wired telephones 50 and configured to calculate MOS values for actual communication speech, two types of MOS measurement equipment 10 and 60 connected to the mobile communication terminals 30 and configured to calculate MOS values for actual communication speech. As is well known, voice communication between such wired telephones 50 and mobile communication terminals 30 is performed in such a way that communication between a Public Switched Telephone Network (PSTN) 70 and a mobile communication network 80, including a base station 82, is performed via a dedicated wired network, and communication between the base station 82 of the mobile communication network 80 and the mobile communication terminals 30 is performed in a wireless manner.

Meanwhile, the pieces of MOS measurement equipment may be classified into two types of equipment 10 and 40 that are respectively connected to the plurality of wired telephones 50 and the plurality of mobile communication terminal 30 and can simultaneously measure MOS values for the wired telephones 50 and the mobile communication terminal 30, and equipment 60 that can measure an MOS value for a single mobile communication terminal. The equipment that can simultaneously measure MOS values for the plurality of mobile communication terminals 30 may include a host computer 10 provided with an MOS measurement algorithm and configured to calculate MOS values, and relay equipment 20 for providing connection ports for the plurality of mobile communication terminals 30, functioning to relay audio signals and control signals between the mobile communication terminals 30 and the host computer 10 or to perform call processing, and detecting the current locations of the respective target measurement mobile communication terminals 30 through a GPS receiver 24. In the drawing, reference numeral 22 indicates a Main Control Unit (MCU) that directly communicates with the host computer 10, and the GPS receiver 24 is connected to the MCU 22. Meanwhile, in the equipment that can measure an MOS value for the single mobile communication terminal 30, a host computer, that is, the MOS measurement equipment 60 is directly connected to the mobile communication terminal 30 without providing separate relay equipment, and thus the MOS value can be measured. It is preferred that each of the host computers 10 and 60 be implemented using a notebook computer so as to enable the measurement of MOS values while circulating among base stations in a vehicle.

FIG. 2 is a block diagram showing the detailed functional blocks of an MOS measurement algorithm to which the method of the present invention is applied. As shown in FIG. 2, the MOS measurement algorithm may include a pair of level controlling units 102 and 104 for automatically controlling the volume level of a reference speech signal, which is used as a reference for MOS value measurement, and the volume level of a speech signal (hereinafter referred to as a 'communication speech signal'), which is distorted or degraded through actual communication with the mobile communication terminals 30 or the wired telephones 50, to a predetermined level; a pair of input filter units 112 and 114 for performing filtering on speech signals, which are transmitted through the respective level controlling units 102 and 104, in consideration of the band pass characteristics of a receiver; a time alignment and equalizing unit 120 for controlling the respective starting points of the reference speech signal and the communication speech signal so that they are the same, in consideration of the time delay that occurs in communication speech signals received from the mobile communication terminals 30 (such a time delay is particularly severe in Voice over Internet Protocol (VoIP)); a pair of auditory transform units 132 and 134 for removing a signal in an inaudible range from each of the reference speech signal and the communication speech signal; a disturbance processing unit 140 for calculating the difference in density between the respective volume levels of the reference speech signal and the communication speech signal; a bad interval detection unit 150 for detecting distorted portions in a sound source interval in response to the processing results of the disturbance processing unit 140; and a speech quality calculation unit 160 for calculating speech quality based on the density difference between the volume levels calculated by the disturbance processing unit 140, and outputting an MOS value.

FIG. 3 is a flowchart illustrating a method of automatically controlling the volume level of communication speech for MOS measurement according to an embodiment of the present invention. It should be noted that the method is performed using the level controlling unit 100. With reference to FIG. 3, at step S10, it is first determined whether an arbitrary audio signal is being received. If it is determined that no audio signal is being received, the process returns to step S10. In contrast, if it is determined that an audio signal is being received, the process proceeds to step S12 and the type of tone signal included in the received audio signal is checked.

FIG. 4 is a waveform diagram illustrating the structure of an audio signal for volume level control according to an embodiment of the present invention. As shown in FIG. 4, the structure of the audio signal for volume level control according to the present invention is configured such that a start tone signal having a regular amplitude and a predetermined audible frequency lasts in the leading portion of the waveform for a predetermined time t1, a silent interval, that is, an idle interval, lasts for a predetermined time t2, and a speech signal lasts for a predetermined time t3 after the idle interval t2. In this case, each of the duration T1 of the start tone signal and the duration T2 of the idle interval t2 may be, for example, 0.5 sec. The duration of the speech signal may be, for example, 2 sec. The start tone signal may be implemented using any of a typical single audible frequency signal, for example, a single signal (hereinafter, referred to as a 'single tone signal'), and a Dual-Tone Multi-Frequency (DTMF) signal, which is used as a dialing signal. The reason why the audible frequency signal is used is because the audio signal for volume level control is transmitted to counterpart measurement equipment through voice communication, and the mobile communication terminal filters out signals other than the audible frequency signal.

Thereafter, at step S14, it is determined whether a tone signal included in the received audio signal is the start tone signal of the audio signal for volume level control. If it is determined that the tone signal is the start tone signal, the process proceeds to step S16, and the volume level of the speech signal, which follows the start tone signal, is measured. Thereafter, the measured volume level is compared with a reference volume level at step S20. Thereafter, at step S22, a tone signal corresponding to the results of the comparison is generated and transmitted to the counterpart measurement equipment. In this case, the tone signal corresponding to the results of the comparison may be classified as a 'proper' tone signal, indicating that the current volume level is proper, an 'insufficiency' tone signal (or increase request tone signal), indicating that the volume level is insufficient by one increment having a predetermined magnitude, or an 'excess' tone signal (or decrease request tone signal), indicating that the volume level is excessive by one increment.

Thereafter, at step S30, whether an acknowledgement tone signal is being received from the counterpart measurement equipment is determined. If it is determined that no acknowledgement tone signal is being received, the process returns to step S10. Whether the volume level control for the counterpart measurement equipment has been completed is checked through the reception of the above-described acknowledgement tone signal. This acknowledgement tone signal may also be implemented using any of a single tone signal, which is distinguished from other kinds of tone signals, and a DTMF tone signal, which is also distinguished from other kinds of tone signals. Furthermore, each of the 'proper' tone signal, the 'insufficiency' tone signal and the 'excess' tone signal may also be implemented using a single tone signal or a DTMF tone signal, which are distinguished from other kinds of tone signals. Meanwhile, such a tone signal is implemented using a tone signal alone, unlike the above-described audio signal for volume level control. Furthermore, such a tone signal, for example, may have a structure in which a duration of 0.5 sec, or a tone signal of 0.5 sec and an idle interval of 0.5 sec, is provided or repeated.

Meanwhile, since the case where the acknowledgement tone signal has been received at step S30 is the case where the volume level control for the counterpart measurement equipment has been completed, the process proceeds to step S32 to make a request for volume level control for tester-side measurement equipment to the counterpart measurement equipment, and an audio signal for the volume level control is transmitted. The step S32 may be performed by reproducing the speech signal in the state in which the start tone signal lasts in the leading portion of the waveform and the idle interval follows the start tone signal, as shown in FIG. 4. Thereafter, at step S34, whether an certain audio signal is being received from the counterpart measurement equipment is determined. If, as a result of the determination at step S34, it is determined that no audio signal is being received, the program repeats step S34. In contrast, if it is determined that an audio signal is being received, the process proceeds to step S36 and whether the received audio signal is the 'proper' tone signal is determined.

If, as a result of the determination at step S36, it is determined that the received tone signal is not the 'proper' tone signal, the received tone signal corresponds to the 'insufficiency' tone signal or the 'excess' tone signal, and thus the process returns to step 32 after the volume level of the speech signal is increased or decreased to be greater or smaller than the current volume level by one increment. If, as a result of the determination at step S36, it is determined that the received tone signal is the 'proper' signal while performing the above-described process, the process proceeds to step S50 and an acknowledgement tone signal is transmitted, therefore the program is terminated. The MOS value measurement is not started until the above-described volume level control process is terminated.

FIG. 5 is a flowchart illustrating a method of automatically controlling the volume level of communication speech for MOS measurement according to another embodiment of the present invention. Since the same reference numerals are assigned to steps identical to those indicated by reference numerals shown in FIG. 3, detailed descriptions thereof are omitted. The present embodiment is described with reference to FIG. 5 below. At step S24, the difference between the volume level of a speech signal, which is measured at step S16, and a reference volume level is calculated. Thereafter, at step S26, a 'proper' tone signal is generated and transmitted when the difference is 0, and a control tone signal, to which the difference is applied, is generated and transmitted when the difference is not 0. In this case, the control tone signal may be implemented using any of an audible frequency signal, which can be distinguished from other kinds of tone signals and has a regular amplitude, or a DTMF tone signal. Furthermore, the control tone signal may be an 'excess' tone signal or an 'insufficiency' tone signal. A level value corresponding to the difference is assigned to follow the control tone signal. Preferably, the control tone signal may have a structure in which an idle interval having a predetermined duration follows the control tone signal.

Meanwhile, if, as a result of the determination at step S36, it is determined that the received audio signal is not the 'proper' tone signal, that is, it is determined that the received audio signal is the control tone signal, the volume level is controlled based on the difference (level value) assigned to follow the control tone signal at one time.

INDUSTRIAL APPLICABILITY

The method of automatically controlling the volume level of communication speech for MOS measurement according to the present invention is not limited to the above-described embodiments, and may be modified and implemented in various ways within the range of the technical spirit of the present invention.

The invention claimed is:

1. A method of automatically controlling a volume level of communication speech for quality measurement using quality measurement equipment, the quality measurement equipment calculating a quality value based on results obtained by comparing a speech signal, which is received via a voice communication network, with a reference speech signal, the method comprising the steps of:
   (a) when a first audio signal, including a first speech signal, is received from counterpart quality measurement equipment in a predetermined format, measuring, by the quality measurement equipment, a volume level of the first speech signal;
   (b) comparing, by the quality measurement equipment, the measured volume level of the first speech signal with a reference volume level;
   (c) generating, by the quality measurement equipment, a predetermined intrinsic audible frequency signal corresponding to results of the comparison, wherein the predetermined intrinsic audible frequency signal comprises one of a 'proper' tone signal indicating that the volume level of the first speech signal is proper, an 'excess' tone signal indicating that the volume level of the first speech signal is excessive and an 'insufficiency' tone signal indicating that the volume level of the first speech signal is insufficient;
   (d) transmitting, by the quality measurement equipment, the predetermined intrinsic audible frequency signal to the counterpart quality measurement equipment;
   (e) receiving, by the counterpart quality measurement equipment, the predetermined intrinsic audible frequency signal;
   (f) if the received predetermined intrinsic audible frequency signal comprises the 'excess' tone signal or the 'insufficiency' tone signal:
      (f1) generating, by the counterpart quality measurement equipment, a second audio signal including a second speech signal;
      (f2) controlling, by the counterpart quality measurement equipment, the volume level of the second speech signal in accordance with the interpreted predetermined intrinsic audible frequency signal, wherein the volume of the second speech signal is decreased relative to the volume of the first speech signal if the received predetermined intrinsic audible frequency signal comprises the 'excess' tone signal, and the volume of the second speech signal is increased relative to the volume of the first speech signal if the received predetermined intrinsic audible frequency signal comprises the 'insufficiency' tone signal; and
      (f3) transmitting, by the counterpart quality measurement equipment, the second audio signal including the second speech signal to the quality measurement equipment; and
   (g) if the received predetermined intrinsic audible frequency signal comprises the 'proper' tone signal, transmitting, by the counterpart quality measurement equipment, an acknowledgement tone signal to the quality measurement equipment, wherein the acknowledgement tone signal is distinguished from the 'proper,' excess' or 'insufficiency' tone signals.

2. The method according to claim 1, wherein, at the step (f1), the volume level of the second speech signal is controlled by a predetermined increment if the received predetermined intrinsic audible frequency signal comprises the 'insufficiency' tone signal.

3. The method according to claim 1, wherein:
   the step (c) comprises generating, by the quality measurement equipment, a control tone signal that indicates an amount of excess or insufficiency;
   the step (d) comprises transmitting, by the quality measurement equipment, the control signal, in addition to the predetermined intrinsic audible frequency signal corresponding to the 'proper,' excess' or 'insufficiency' information, to the counterpart MOS measurement equipment; and
   the step (f2) comprises controlling, by the counterpart quality measurement equipment, of the volume level of the second speech signal according to the amount of excess or insufficiency at one time.

4. The method according to claim 1, wherein the predetermined intrinsic audible frequency signal is a single frequency signal having a regular amplitude.

5. The method according to claim 1, wherein the predetermined intrinsic audible frequency signal is a Dual-Tone Multi-Frequency (DTMF) signal.

6. The method according to claim 2, wherein the predetermined intrinsic audible frequency signal is a single frequency signal having a regular amplitude.

7. The method according to claim 3, wherein the predetermined intrinsic audible frequency signal and/or the control tone signal is a single frequency signal having a regular amplitude.

8. The method according to claim 2, wherein the predetermined intrinsic audible frequency signal is a Dual-Tone Multi-Frequency (DTMF) signal.

9. The method according to claim 3, wherein the predetermined intrinsic audible frequency signal and/or the control tone signal is a Dual-Tone Multi-Frequency (DTMF) signal.

10. The method according to claim 1, wherein the quality measurement is a Mean Opinion Score (MOS) measurement, the quality measurement equipment is MOS measurement equipment, the counterpart quality measurement equipment is counterpart MOS measurement equipment, and the quality value calculated by the quality measurement equipment is an MOS value.

* * * * *